UNITED STATES PATENT OFFICE.

HUGO W. LANGBECK, OF LOUGHTON, COUNTY OF ESSEX, ENGLAND.

PROCESS OF REFINING WOOL-FAT.

SPECIFICATION forming part of Letters Patent No. 399,906, dated March 19, 1889.

Application filed August 27, 1888. Serial No. 283,865. (Specimens.) Patented in England September 2, 1886, No. 11,192.

*To all whom it may concern:*

Be it known that I, HUGO WALDEMAR LANGBECK, a subject of the Queen of Great Britain, residing at 2 Claremont Villas, Loughton, in the county of Essex, England, have invented a certain new and useful Process for the Treatment of Wool-Fat to Produce Unguent or Lubricant Material Therefrom, (for which I have obtained a patent in Great Britain, dated September 2, 1886, No. 11,192,) of which the following is a specification.

This invention relates to the treatment of wool-fat for the separation therefrom of unguent or lubricant material in a pure and inodorous condition; and to such end my invention consists, essentially, in separating the fatty acids from the raw material by a solvent, treating the residue while in a melted or dissolved condition with prussiate waste by stirring it together with the same for a lengthened period, then dissolving the purified fat and removing the prussiate waste, and finally separating the solvent from the purified fat, as more fully hereinafter explained.

By the term "wool-fat" I desire to include either that which is known as "recovered fat," or that which may be recovered from leys of wool-washing works after neutralization of their alkaline ingredients, or that which is extracted from wool by means of solvents, or that which is extracted by the ancient method of simply treating the wool with warm water and pressure. For this purpose I first separate the fatty acids and free cholesterine and isocholesterine, which may be done in either of two ways—either by dissolving them out by the use of solvent or solvents consisting of alcohol or alcohol mixed with ether, chloroform, carbon bisulphide, acetone, benzoline, or naphtha, using, for instance, a mixture of four parts of alcohol with one part of carbon bisulphide, or by distilling the acids off, preferably by superheated steam. The fatty residue, after separation of the acids, is then treated with prussiate waste, either by digestion with and filtration through it in a dissolved or melted condition, or, by preference, as hereinafter described, after which steam or warm air is blown through the fatty matter until all traces of the solvent have disappeared when such has been used, leaving a pure and inodorous fatty residue. When this is to be used as a basis for ointments, twenty to thirty per cent. of water is incorporated with it by adding the water in successive small doses to the fat, or, instead of water, peroxide of hydrogen or part of the condensed steam is allowed to remain in it.

Instead of first separating the fatty acids and then treating the residue with prussiate waste, as above described, the raw fat may be first treated with the prussiate waste and the separation of the fatty acids be afterward effected; but I prefer the method of operating first described.

In practically carrying out my above-described invention I proceed as follows: The raw wool-fat is introduced into a suitable pan made either of copper tinned or nickel-plated inside, or an enameled iron pan, or made of wood fitted with a steam-coil and a stirring apparatus. Steam is then let on, and when the fat is melted the solvent or solvents is or are introduced and mixed intimately with the fat by means of the stirring apparatus. The fat is then allowed to separate by subsidence, and the solvents are siphoned off, and this treatment is repeated with fresh solvents until the wool-fat is perfectly free from fatty acids, cholesterine and isocholesterine. The remaining fat is then again heated, to drive off the last traces of alcohol, and, either by itself or dissolved in benzine, carbon bisulphide, &c., is thoroughly mixed while warm with prussiate waste. After having been left in contact with the prussiate waste, while warm, and stirring occasionally for about six or eight hours, benzine, naphtha, carbon bisulphide, acetone, or a mixture of two or more of these solvents, is introduced into the mass, in order to dissolve the purified wool-fat, which is then separated from the prussiate waste by means of a filter-press, centrifugal apparatus, or percolator. The solvent is then recovered by distillation and the last traces of the solvent driven off by blowing steam or warm air through the fat. The purified wool-fat, after having been separated from the condensed steam, is then of a yellowish color, free from smell. When this fat is to be used as basis for ointments, pomatums, &c., twenty to thirty per cent. of water or of an aqueous solution of peroxide of hydrogen of from two to twenty volumes—*i. e.*, two to twenty volumes peroxide to one volume of water—is incorporated with it by adding the water or peroxide of hydrogen in successive small doses, thus producing a white material; or, instead of water or peroxide of hydrogen, part of the condensed steam is allowed to remain in it.

I do not broadly claim the treating fats with alcohol and filtering the same through charcoal, as such of itself does not constitute my invention.

Having thus described the nature of my invention and the best means I know for carrying the same into practical effect, I claim—

The process herein described of treating wool-fat to produce unguent or lubricant material, which consists in separating the fatty acids from the raw material by a solvent, treating the residue while in a melted or dissolved condition with prussiate waste by stirring it together with the same for a lengthened period, then dissolving the purified fat and removing the prussiate waste, and finally separating the solvent from the purified fat, substantially as described.

In testimony whereof I have signed my name to this specification, in the presence of two subscribing witnesses, this 14th day of August, A. D. 1888.

H. W. LANGBECK.

Witnesses:
CHAS. D. ABEL,
*Patent Agent,* 28 *Southampton Buildings, London, W. C.*
JNO. P. M. MILLARD,
*Clerk to Messrs. Abel & Imray, Consulting Engineers and Patent Agents,* 28 *Southampton Buildings, London, W. C.*